(12) United States Patent
Stevens et al.

(10) Patent No.: US 9,221,417 B1
(45) Date of Patent: Dec. 29, 2015

(54) RELEASABLE TETHER RETENTION SYSTEM

(71) Applicant: TK Holdings Inc., Armada, MI (US)

(72) Inventors: Bruce A. Stevens, Oakland Township, MI (US); Eduardo L. Quioc, Westland, MI (US)

(73) Assignee: TK Holdings Inc., Armada, MI (US)

( * ) Notice: Subject to any disclaimer, the term of this patent is extended or adjusted under 35 U.S.C. 154(b) by 0 days.

(21) Appl. No.: 14/101,239

(22) Filed: Dec. 9, 2013

Related U.S. Application Data

(62) Division of application No. 13/153,225, filed on Jun. 3, 2011, now Pat. No. 8,602,453.

(51) Int. Cl.
*B60R 21/217* (2011.01)

(52) U.S. Cl.
CPC .................................. *B60R 21/217* (2013.01)

(58) Field of Classification Search
USPC ....................................................... 280/743.2
See application file for complete search history.

(56) References Cited

U.S. PATENT DOCUMENTS

| | | | | |
|---|---|---|---|---|
| 5,887,894 A * | 3/1999 | Castagner et al. | .......... | 280/743.2 |
| 6,511,094 B2 * | 1/2003 | Thomas et al. | ............. | 280/743.2 |
| 6,513,835 B2 * | 2/2003 | Thomas | ....................... | 280/743.2 |
| 6,749,217 B2 * | 6/2004 | Damian et al. | ................. | 280/734 |
| 7,419,184 B2 * | 9/2008 | Green et al. | ............... | 280/743.2 |
| 7,461,859 B2 * | 12/2008 | Fogle et al. | .................... | 280/739 |
| 7,469,926 B2 * | 12/2008 | Lewis et al. | .................... | 280/736 |
| 7,490,854 B2 * | 2/2009 | Thomas | ........................ | 280/739 |
| 7,591,482 B2 * | 9/2009 | Thomas et al. | ............... | 280/739 |
| 7,681,913 B2 * | 3/2010 | Thomas | ....................... | 280/736 |
| 7,690,683 B2 * | 4/2010 | Parks et al. | ................. | 280/743.2 |
| 7,735,860 B2 * | 6/2010 | Fischer et al. | ..................... | 280/739 |
| 7,753,405 B2 * | 7/2010 | Ishiguro et al. | ................. | 280/739 |
| 7,762,584 B2 * | 7/2010 | Morita et al. | ................. | 280/739 |
| 7,841,623 B2 * | 11/2010 | Ito | ............................... | 280/743.2 |
| 8,015,906 B2 * | 9/2011 | Ito et al. | ......................... | 89/1.14 |
| 8,322,748 B2 * | 12/2012 | Abe et al. | ....................... | 280/739 |
| 8,602,453 B1 | 12/2013 | Stevens et al. | ............. | 280/743.2 |
| 2002/0135166 A1 * | 9/2002 | Thomas | ........................ | 280/735 |
| 2006/0192370 A1 * | 8/2006 | Abe et al. | ....................... | 280/735 |
| 2007/0205591 A1 * | 9/2007 | Bito | ............................ | 280/743.2 |
| 2007/0295232 A1 * | 12/2007 | Hirooka et al. | ............... | 102/202 |
| 2008/0238058 A1 * | 10/2008 | Numoto et al. | ............... | 280/737 |
| 2009/0302588 A1 * | 12/2009 | Schramm | .................... | 280/743.2 |
| 2011/0309605 A1 * | 12/2011 | Kumagai | ...................... | 280/741 |
| 2012/0242068 A1 * | 9/2012 | Paxton et al. | ............... | 280/743.2 |
| 2012/0242069 A1 * | 9/2012 | Parks et al. | ................. | 280/743.2 |
| 2012/0242070 A1 * | 9/2012 | Paxton et al. | ............... | 280/743.2 |

\* cited by examiner

*Primary Examiner* — Nicole Verley
(74) *Attorney, Agent, or Firm* — L.C. Begin & Associates, PLLC

(57) ABSTRACT

A releasable tether retention system includes a housing and a tether retention member including a portion movably mounted in the housing. The system is configured to retain a tether on the member when the member is positioned in a first position, and configured so that a tether retained on the member is released from the member during movement of the member from the first position to a second position different from the first position.

12 Claims, 10 Drawing Sheets

RELEASABLE TETHER RETENTION SYSTEM

CROSS-REFERENCE TO RELATED APPLICATIONS

This application is a divisional of, and claims the benefit of, U.S. application Ser. No. 13/153,225, (filed on Jun. 3, 2011), which claims the benefit of U.S. Provisional Application Ser. No. 61/351,242, filed on Jun. 3, 2010; 61/351,631, filed on Jun. 4, 2010; 61/405,971, filed on Oct. 22, 2010; and 61/446,920, filed on Feb. 25, 2011. The disclosures of all of the above-referenced applications are incorporated herein by reference in their entireties.

BACKGROUND OF THE INVENTION

Airbags and other pliable and inflatable restraints are being designed using releasable tethers to selectively modify the shape of the restraint, to provide the restraint with enhanced rigidity, and to control venting of the restraint during deployment. While it is necessary to securely retain the tether prior to activation of the inflatable device, at some point during or after deployment of the inflatable device it is frequently necessary to release the tether so that it no longer restrains the inflatable device. Thus, there is an ongoing need for tether retention systems of reduced cost and/or complexity which reliably retain the tether until release of the tether is desired, and which also reliably release the tether at the desired time.

SUMMARY OF THE INVENTION

In one aspect of the embodiments of the present invention, a releasable tether retention system is provided including a housing and a tether retention member movably mounted to the housing. The system is configured to retain a tether on the member when the member is positioned in a first position, and configured so that a tether retained on the member is released from the member during movement of the member from the first position to a second position different from the first position.

In another aspect of the embodiments of the present invention, a releasable tether retention system is provided including a housing defining a bore extending along an interior of the housing, and a passage extending through a width of the housing from a first side of the housing to a second side of the housing opposite the first side. A first end of the passage is configured to receive a portion of a tether therein. In addition, the passage intersects the bore.

In another aspect of the embodiments of the present invention, a releasable tether retention system is provided including a housing defining a bore extending along an axis of the housing. A tether retention member has a first portion mounted in the housing so as to be movable along the bore, and a second portion coupled to the first portion and configured for retaining a portion of a tether thereon. The second portion extends parallel to and spaced apart from the housing axis.

In another aspect of the embodiments of the present invention, a releasable tether retention system is provided including a housing defining a bore, and a tether retention member. The retention member has a first portion configured for moving along the bore and a second portion configured for retaining a portion of a tether thereon. The first portion has at least one opening to enable fluid communication between a first side of the first portion and a second side of the first portion opposite the first side. The retention member is movable along the bore responsive to passage of a pressurized fluid through the at least one opening from the first side to the second side.

DETAILED DESCRIPTION

Figure 1:
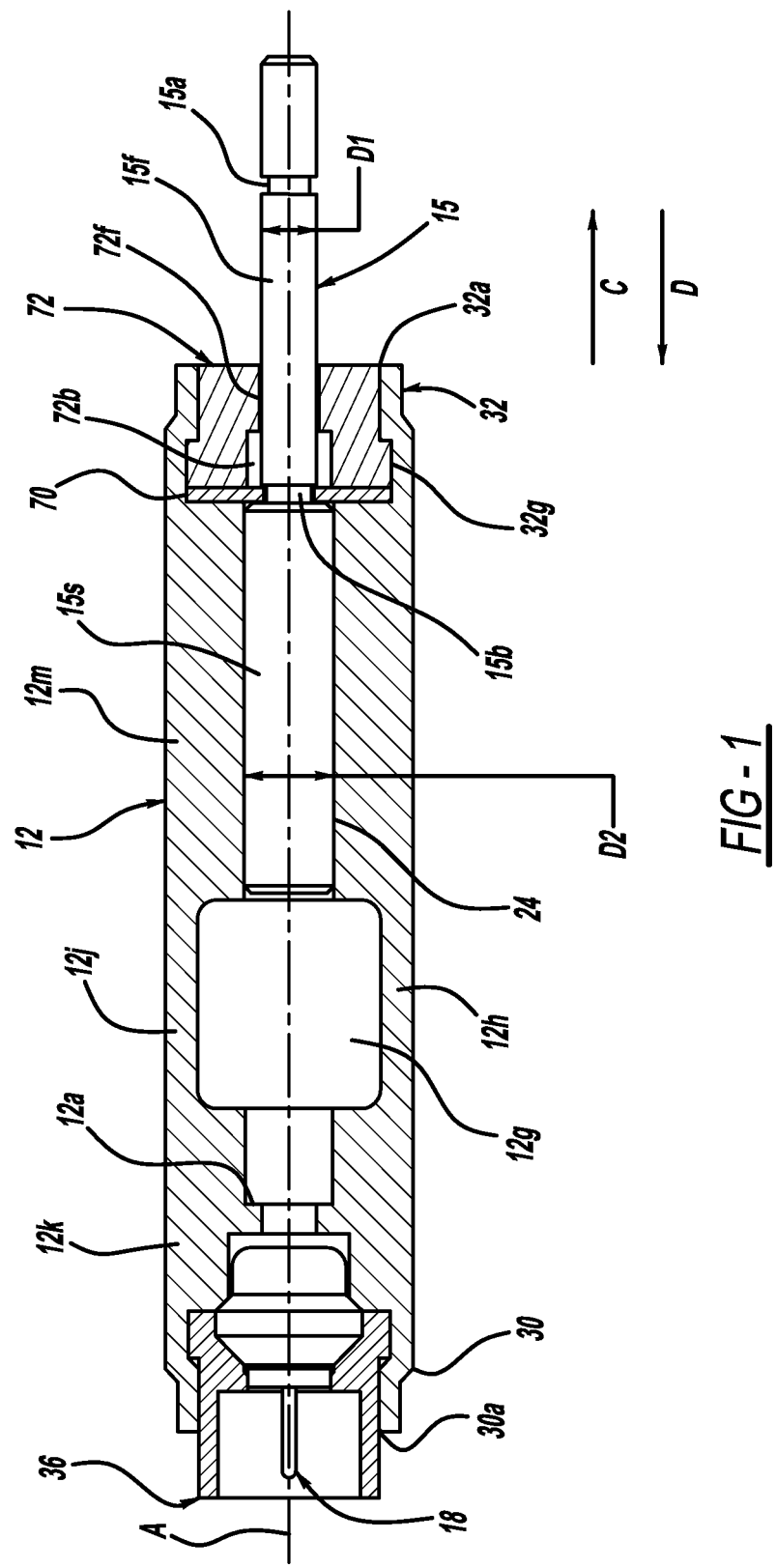
FIGS. 1 and 4 are cross-sectional side views of a releasable tether retention system and associated components thereof in accordance with one embodiment of the present invention in an "as-shipped" condition prior to application of a tether thereto.

In the embodiments of the tether retention system disclosed herein, the tether is considered to be retained on the retention member when the tether is wrapped around or otherwise secured to the retention member such that movement of the secured portion of the tether away from the retention system is prevented. Also, the tether is considered to be released from the retention member when the tether is detached or separated from the member and thus no longer retained by the member.

The embodiments of the tether retention system described herein include a housing and a tether retention member including a portion movably mounted in the housing. The retention member is movable between a first, pre-system activation position in which the tether is retained by the retention member, and a second, post-system activation in which the tether is no longer retained on the member. The tether is released from the member during movement of the member from the first position to the second position.

Referring to the embodiment shown in FIGS. 1-6, a releasable tether retention system 10 in accordance with one embodiment of the present invention includes a housing 12, a tether retention member 15 slidably or otherwise movably mounted to housing 12, a locking member 70 for locking the tether retention member in one of a plurality of predetermined positions, a tether retention member retainer 72 for retaining the tether retention member 15 within housing 12, and an actuator 18 operatively coupled to housing 12 for producing a motion of tether retention member 15 after receipt of an actuation signal.

In the embodiment shown in FIGS. 1-6, housing 12 is generally cylindrical and has a first end 30 with a first opening 30a and a second end 32 opposite first end 30. The second end 32 includes a second opening 32a. A housing wall extends between first and second ends 30 and 32. In the embodiment shown, openings 30a and 32a are substantially coaxial along an axis A of the housing. An axial bore 24 extends through housing 12 between first end 30 and second end 32. In a particular embodiment, housing first end 30 is configured so as to be crimpable or otherwise deformable to aid in retaining actuator 18 within (or to) housing 12. Housing 12 may include features such as shoulder 12a (not shown) configured to limit the travel of tether retention member 15 (described below) within bore 24 during operation of the tether retention system. Housing 12 may be formed using any suitable method from a metallic material or any other suitable material.

Second opening 32a leads into a cavity 32g configured for receiving a tether retention member retainer 72 (described below) therein. Housing second end 32 may be configured so as to be crimpable or otherwise deformable to aid in securing retainer 72 within (or to) housing 12.

Housing 12 also has an opening extending through a width of the housing to define a passage 12g therethrough for receiving therein an end 22a of tether 22, to permit the tether end loop over tether retention member 15 (described below). A pair of connecting portions 12h and 12j connect a first housing portion 12k to a second housing portion 12m.

Thus, the embodiment of the tether retention system shown in FIGS. 1-6 includes a housing 12 defining a bore 24 extending along an interior of the housing, and a passage 12g extending through a width of the housing from a first side of the housing to a second side of the housing opposite the first side. A first end of the passage 24 is configured to receive a portion of tether 22 therein. In addition, passage 12g intersects the bore 24.

The housing may also incorporate features (not shown) configured for orienting the housing when the housing is mounted on base 20 (described below) so that passage 12g extends substantially orthogonally with respect to the base, thereby permitting the tether 22 to extend into the passage 12g with minimal interference from the remainder of the housing. In one example, one or more flat surfaces are formed in the housing exterior for abutting a surface of the base 20.

Housing 12 may be formed using any suitable method from a metallic material or any other suitable material.

Figures 2, 3:
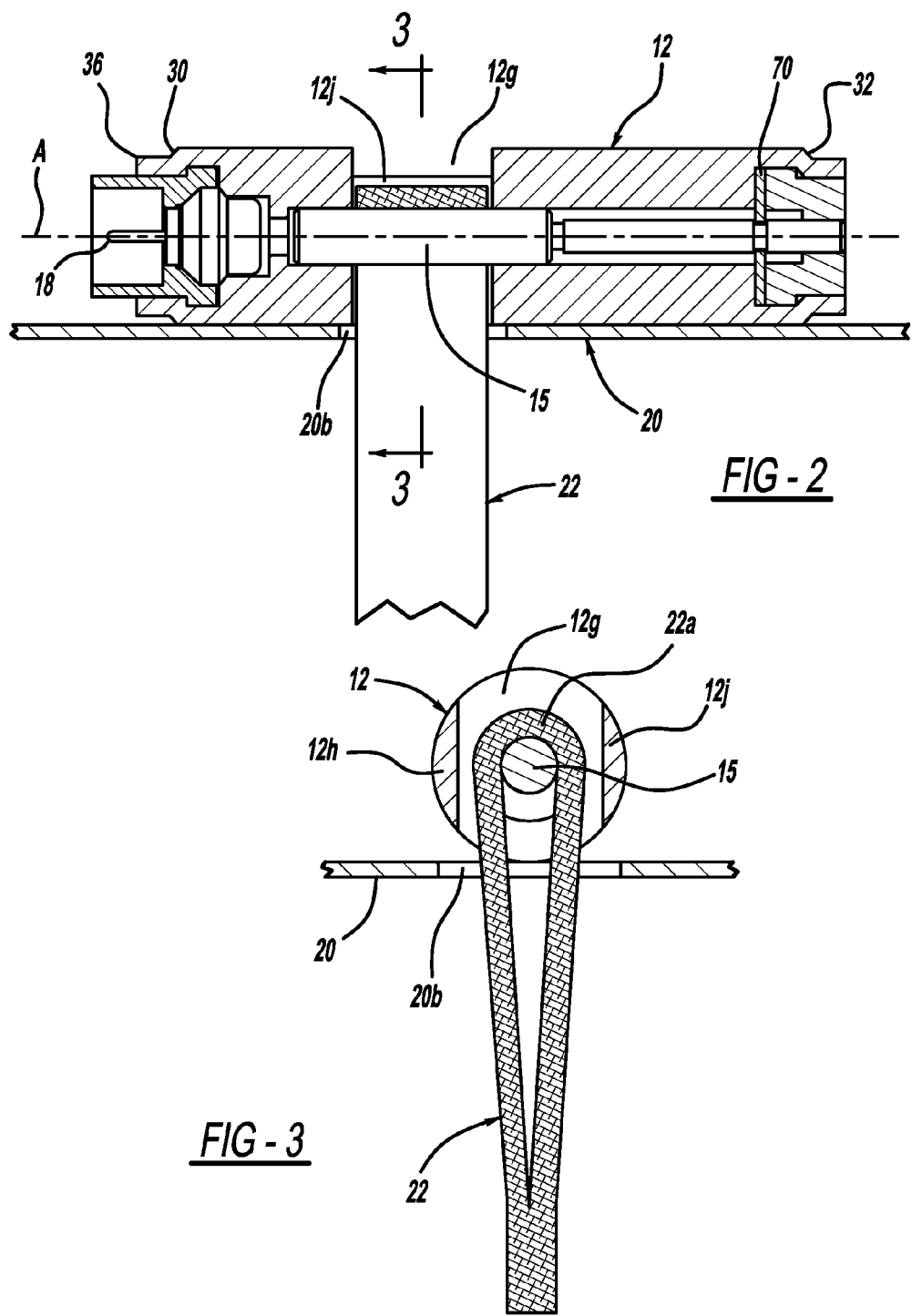
FIG. 2 is a view of the embodiment shown in FIG. 1 showing the tether retention system in a pre-activation condition with a tether retained thereon.
FIG. 3 is a cross-sectional end view of a portion of the retention system shown in FIG. 2.
Figure 4:
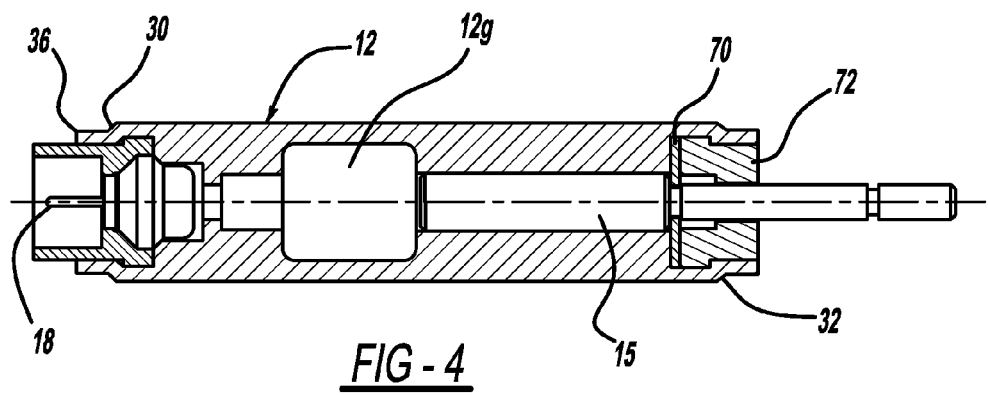

A base 20 is provided for mounting of housing 12 thereto. In one embodiment, base 20 comprises an integral portion of a vehicle or other device to which tether retention system 10 is to be attached. In another embodiment, base 20 is formed separately from the vehicle or other element and is attached by welding or any other suitable method to a portion of the vehicle or other device to which the tether retention system is to be secured. Base 20 includes an opening 20b formed therein to permit tether 22 to extend therethrough. Housing 12 is mounted to the base 20 over opening 20b, as shown in FIGS. 2 and 3. In an alternative embodiment, housing 12 is secured to another portion of the vehicle or device to which the tether retention system is mounted, but is still positioned and secured over opening 20b.

An actuator 18 is operatively coupled to housing first end 30 so as to enable fluid communication between the actuator and bore 24 containing tether retention member 15, after activation of the system to release the tether. Actuator 18 is configured to provide a pressurized fluid for moving the tether retention member from a first, pre-activation position to a second position in which the tether is released. In a particular embodiment, actuator 18 is secured directly to housing first end 30 and extends into bore 24. In one embodiment, actuator 18 is in the form of an electrically-actuated pyrotechnic initiator, or squib, secured within a bore seal 36. Actuator 18 may be formed as known in the art. One exemplary actuator construction is described in U.S. Pat. No. 6,009,809, herein incorporated by reference. Bore seal 36 may be stamped, extruded, cast, machined, or otherwise metal formed and may be made from carbon steel or stainless steel, for example.

Actuator 18 may be secured within bore seal using any of a variety of known methods including, but not limited to, an interference fit, adhesive application, or crimping. Similarly, bore seal 36 may be secured to housing 12 using any of a variety of known methods including, but not limited to, crimping, welding, or adhesive application. In addition, features (not shown) may be provided for engaging the actuator and/or bore seal with base 20 or a portion of the vehicle or device to which system 10 is mounted, to aid in preventing rotation or other movement of the actuator relative to housing 12 and/or base 20.

In alternative embodiments, actuator 18 may be in the form of a pneumatically or hydraulically actuated valve (not shown) coupled to an end of housing 12 so as to enable fluid communication between an outlet of the valve and bore 24 upon receipt by the retention system of a suitable activation signal. In these embodiments, activation of the system to release the tether results in opening of the valve to admit a high-pressure fluid into bore 24, resulting in movement of the tether retention member 15 as described below. Alternatively, actuator 18 may be positioned remotely from housing 12 but so as to enable fluid communication between the actuator and bore 24 upon receipt by the retention system of a suitable activation signal.

In the embodiment shown in FIGS. 1-6, tether retention member 15 is configured to slidably move along and within bore 24. Tether retention member includes a mechanism for enabling releasable locking of the tether retention member or for otherwise restricting travel of the member 15 within bore 24 along axis A so that the member is retainable in one of a plurality of discrete, predefined stop positions. The locking mechanism is configured to prevent motion of the tether retention member along bore 24 until an axial force is applied to the tether retention member in one of the directions indicated by arrows C and D (FIG. 1).

In the embodiment shown in FIGS. 1-6, the locking mechanism locks the retention member 15 in a first, pre-activation position (shown in FIGS. 2, 3, and 5) when the tether 22 is supported by the retention member. After activation of the system to release the tether, retention member 15 moves from the position shown in FIG. 5 to a second position (shown in FIG. 6) in which support for the tether has been removed, thereby releasing the tether.

Figure 5:
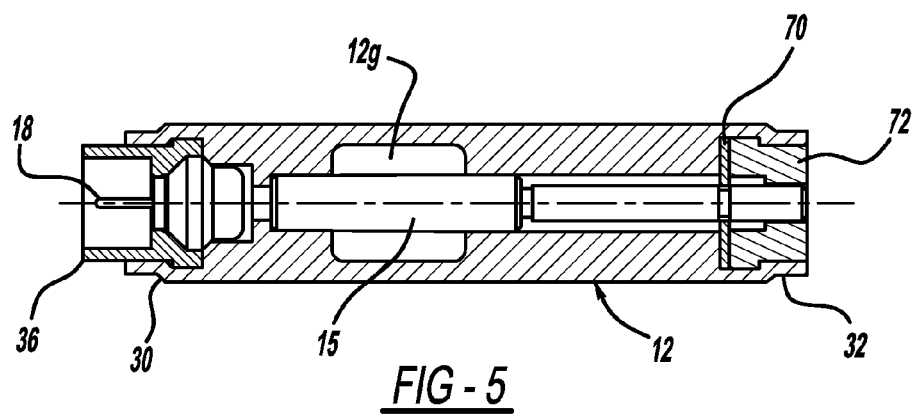
FIG. 5 is a view of the embodiment shown in FIG. 1 showing the tether retention system in a pre-activation condition.

In one embodiment, the locking mechanism includes a first groove 15a and a second groove 15b formed along tether retention member 15 and configured for receiving therein a portion of a locking member 70 (described below). Groove 15a engages the locking member 70 when the tether retention member 15 is in a pre-deployment position (i.e., when the tether end 22a is looped around the tether retention member and retained on the member and within housing 12) as shown in FIGS. 2 and 5, to releasably secure the tether retention member in the pre-deployment position prior to activation of the system to release the tether. Groove 15b engages the locking member 70 when the tether retention member 15 and housing are in an "as-shipped" condition (shown in FIGS. 1 and 4) prior to attachment of the housing to base 20 and securement of tether end 22a to the housing.

In the embodiment shown in FIGS. 1-6, a first portion 15f of the retention member between grooves 15a and 15b has a first diameter D1, and a second portion 15s of the member has a second diameter D2 larger than the first diameter.

In one embodiment, the tether retention member second diameter D2 is sized so as to prevent second portion 15s from passing into a relatively narrow section 72f of a bore 72b formed in tether retention member retainer 72 (described below). In addition, an outer dimension of tether retention member 15 may be specified so as to provide a relatively close fit with the portion of bore 24 located in housing portion 12k. This aids in providing a seal for propulsive gases or other pressurized fluids provided by activation of actuator 18.

Tether retention member 15 may be formed from a metallic material or any other suitable material.

In one embodiment, locking member 70 is in the form of a lock washer or locking ring having protrusions or other engagement features (not shown) extending inwardly from a center orifice formed therein, for engaging grooves 15a and 15b on tether retention member 15.

The locking member engagement features may be resiliently deformable, breakable, or otherwise movable so that they may be deflected or removed from their engagement positions within grooves 15a and 15b by motion of the tether retention member 15 along bore 24. The geometry of grooves 15a and 15b may also be specified so as to facilitate deflection or removal of the engagement features from the grooves upon application of a predetermined minimum axial force to the tether retention member.

Locking member 70 may be formed from a metallic material, a polymer material, or any other suitable material.

Retainer 72 is received and secured within housing end cavity 32g. Retainer 72 has a bore 72b extending therethrough. Bore 72b has a first section 72f having a first diameter d1, and a second section 72s having a second diameter d2 which is relatively larger than first diameter d1. First diameter d1 is sized so as to prevent tether retention member second portion 15s from passing therethrough. This aids in preventing withdrawal of the tether retention member from housing 12.

Figure 6:
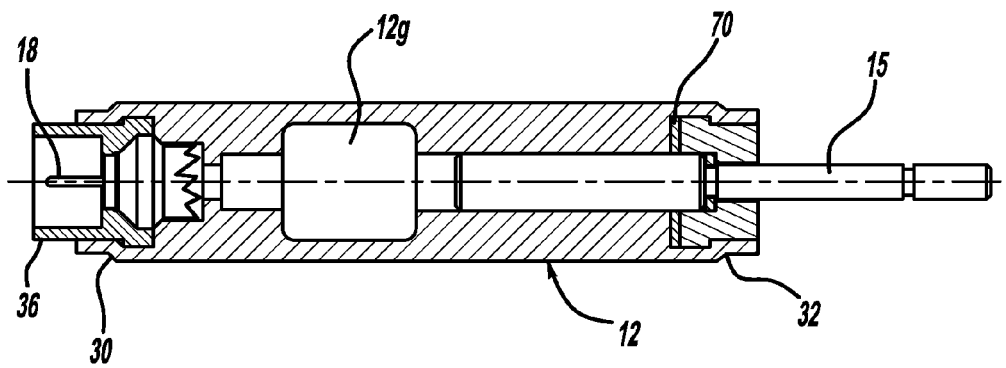
FIG. 6 is a view of the embodiment shown in FIG. 5 showing the tether retention system in a post-activation condition, after release of the tether.

In a particular embodiment, a detent feature (not shown) is provided for ensuring sufficient engagement or interference between the tether retention member and retainer 72 such that movement of the tether retention member 15 is gradually slowed or retarded as the tether retention member approaches the post-activation or "end" condition shown in FIG. 6.

In one particular embodiment, the detent feature is in the form of a knurl, stake, or other deformation 15d in a surface of the tether retention member which engages a wall of the housing defining the bore 24.

In another particular embodiment, the detent feature is formed in the housing, rather than in the tether retention member 15.

In another particular embodiment, the detent effect is provided by dimensioning the bore diameter and an outer diameter or dimension of the tether retention member 15 such that a slight interference between the tether retention member and the housing is provided as the tether retention member moves in the direction of arrow C.

In a particular embodiment, one or more of diameters d1, d2, and the diameter of the bore 24 may be tapered from a relatively larger dimension to a relatively smaller dimension along the direction of movement of tether retention member 15, so that slowing of the tether retention member is relatively gradual. The rate of deceleration of the tether retention member along bore 24 may be controlled to some degree by the severity of the taper. Dimensions D1 and D2 of the tether retention member may also be specified so as to affect the rate of deceleration of the tether retention member within the housing and/or retainer 72.

Retainer 72 may be secured within housing 12 using any of a variety of known methods including, but not limited to, an interference fit, adhesive application, or crimping. Retainer 72 may be formed from a metallic material, a polymer material, or any other suitable material.

A securement member (for example, a conventional hold-down strap) (not shown) or other suitable means may be used to secure the housing 12 to base 20 or to another portion of the vehicle or device to which the system 10 is attached.

Referring to FIG. 5, system 10 may be assembled as follows. Housing passage 12g is positioned over base opening 20b and secured to the base. Tether end 22a is then fed through base opening 20b and into housing passage 12g. tether retention member is then forced from the position shown in FIG. 4 deeper into housing 12, through the loop formed in tether end 22a, and into the portion of the housing on the opposite side of passage 12g, as shown in FIG. 5, until locking member 70 engages groove 15a to releasably lock the tether retention member in the pre-deployment position. Such features as the length of the tether retention member, the position of groove 15a along the member, and other pertinent features may be specified such that an end 15k of the tether retention member is substantially flush with an end 72k of retainer 72 (as shown in FIG. 5) when the tether retention member is secured in the pre-deployment position, thereby indicating to a user that the tether retention member is properly seated within the housing.

FIGS. 2 and 3 show the tether retention system with retention member 15 in a first, pre-activation position and a tether 22 retained on the member prior to activation of the system to release the tether. Referring to FIGS. 2, 3, and 6, in operation, upon receipt of a signal from a crash sensor or other system activation mechanism, an activation signal is sent to actuator 18. In an embodiment where the actuator is a squib, combustion products from the squib impinge on an end face of tether retention member 15 in fluid communication with the actuator. Due to gas pressure acting on the end face of tether retention member 15, the locking features engaging groove 15a are deflected, deformed, sheared away, or otherwise removed from their engagement positions within the groove, permitting the tether retention member to move in the direction indicated by arrow "C" in FIG. 1. The tether retention member moves within the housing until it reaches a second position shown in FIG. 6, where it is stopped by interference with housing 12 and/or retainer 72. FIG. 6 shows that one or more of the features on locking element 70 have been sheared off or otherwise disabled by forces exerted thereon by tether retention member second portion 15s. As the tether retention member moves in direction "C" from the first position shown in FIG. 2 toward the second position shown in FIG. 6, the member withdraws from the looped portion 22a of tether 20. During extraction of the retention member from the tether looped portion, the tether looped portion 22a may abut a portion of housing 12. Tether is thereby released from the member 15 to fall out of housing passage 12g.

Figure 8:
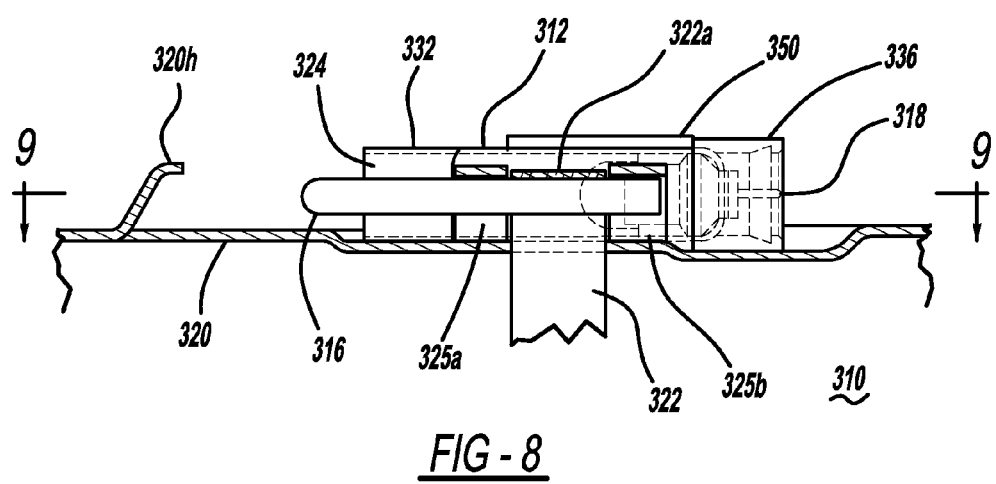
FIG. 8 is a side view of a releasable tether retention system and associated components thereof in accordance with another embodiment of the present invention, showing the system in a pre-activation condition with a tether retained thereon.
Figure 9:
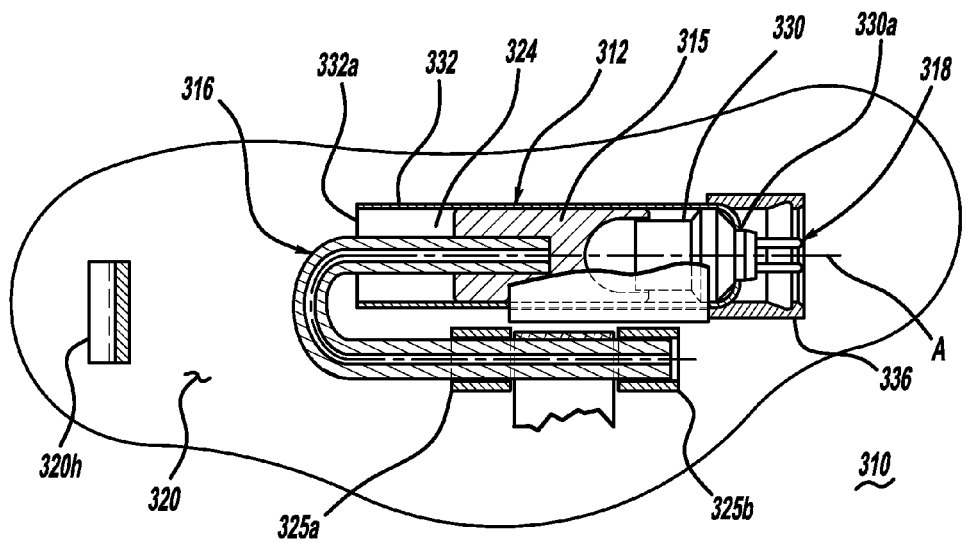
FIG. 9 is a cross-sectional plan view of the embodiment shown in FIG. 8.
Figure 10:
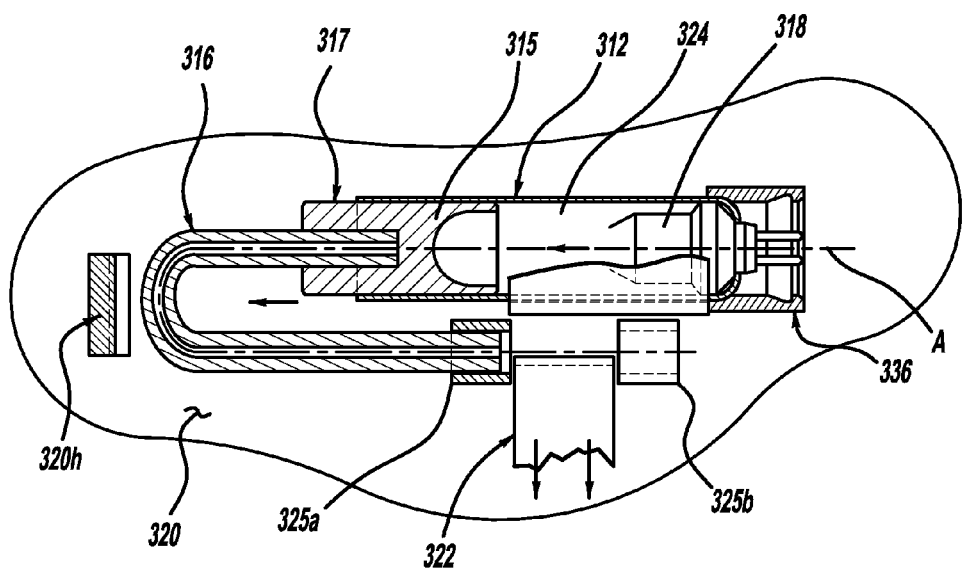
FIG. 10 is a cross-sectional plan view of the embodiment shown in FIG. 9 in a post-activation condition, after release of the tether.
Figure 11:
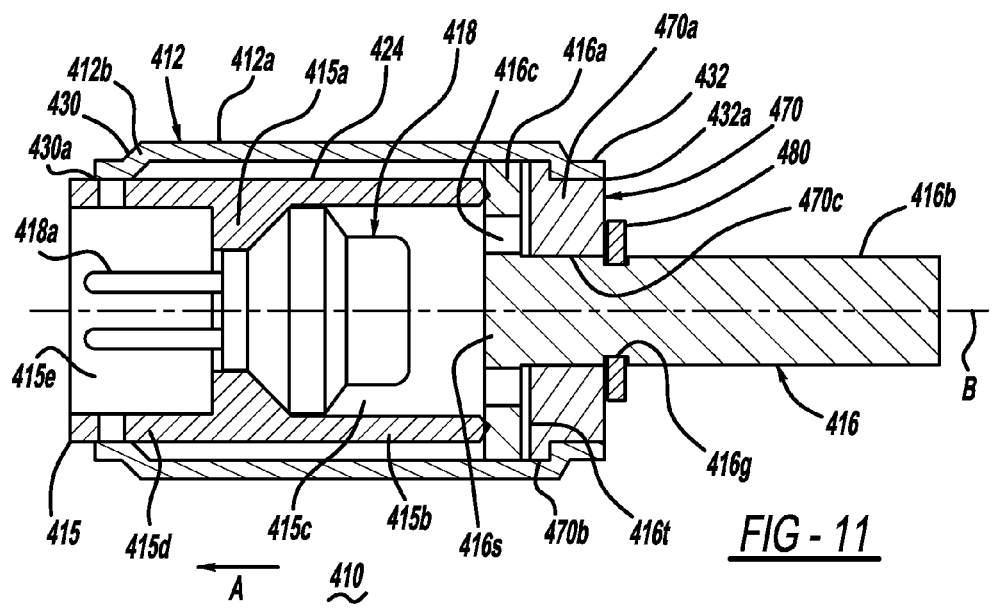
FIG. 11 is a cross-sectional side view of a releasable tether retention system and associated components thereof in accordance with another embodiment of the present invention.

Referring now to FIGS. 8-10, a releasable tether retention system 310 in accordance with another embodiment of the present invention includes a housing 312, a tether retention member 315 slidably or otherwise movably mounted in housing 312 for supporting a tether 322 prior to activation of the tether retention system to release the tether, and an actuator 318 operatively coupled to housing 312 for producing a motion of tether retention member 17 after receipt of an actuation signal.

Housing 312 has a first end 330 with a first opening 330a and a second end 332 opposite first end 330. The second end 332 includes a second opening 332a. In the embodiment shown, openings 330a and 332a are substantially coaxial along an axis A of the housing. An axial bore 324 extends through housing 312 between first end 330 and second end 332. In a particular embodiment, housing first end 330 is configured so as to be crimpable or otherwise deformable to aid in retaining actuator 318 within (or to) housing 312. Housing 312 may include features such a shoulder (not shown) configured to limit the travel of movable member 315 (described below) within bore 324 during operation of the tether retention system.

Housing 312 may be mounted to any suitable surface, for example, to a portion of a vehicle or device to which the tether retention system operatively coupled. In a particular embodiment, the housing is mounted to a base 320 (described below) to which braces 325a and 325b (described below) are also mounted. In another embodiment, the mounting surface for housing 312 is formed separately from the vehicle or device and is attached by welding or any other suitable method to a portion of the vehicle or device. Housing 312 is mounted to its mounting surface so as to remain fixed or stationary with respect to base 320. Housing 312 may be formed using any suitable method from a metallic material or any other suitable material.

In the embodiment shown in FIGS. 8-10, tether retention member 317 comprises a movable member 315 and a support member 316 coupled to the movable member 315. FIGS. 8 and 9 show the retention member 317 in a first, pre-activation position in which the tether 322 is retained thereon. Movable member 315 is configured to slidably move along and within bore 324. Movable member is positioned either in fluid communication with actuator 318 (described below) or so as to enable fluid communication with the actuator after activation of the valve actuation mechanism. Activation of actuator 318 in the manner described below produces motion of the movable member 315 within bore 324.

In one embodiment, a detent feature (not shown) is provided for preventing movement of the movable member 315 within bore 324 prior to activation of the retention mechanism to release the tether. In one particular embodiment, the detent feature is in the form of a knurl, stake, or other deformation (not shown) in a surface of the movable member which engages a wall of the housing defining the bore 324. In another particular embodiment, the detent feature is formed in the housing, rather than in the movable member 315.

Support member 316 is coupled to movable member 315 so as to move in conjunction with the movable member. In the embodiment shown in FIGS. 8-10, the support member is generally "U"-shaped with a portion of the support member 316 positioned and secured within a complementary cavity formed in movable member 315. However, the support member may have any desired shape based on the requirements of a particular application. Support member 316 may be formed from a metallic material or any other suitable material.

Thus, the embodiment of the tether retention system shown in FIGS. 8-10 includes a housing 312 defining a bore 324 extending along an axis A of the housing. A tether retention member 317 has a first portion 315 mounted in the housing 312 so as to be movable along the bore 324, and a second portion 316 coupled to the first portion 315 and configured for retaining a portion of a tether 322 thereon. The second portion 316 extends parallel to and spaced apart from the housing axis A.

Movable member 315 may be formed from a metallic material or any other suitable material. Support member 316 may also be formed from a metallic material or any other suitable material.

Actuator 318 is configured to provide a pressurized fluid for moving the tether retention member from a first, pre-activation position to a second position in which the tether is released. In the embodiment shown in FIGS. 8-10, actuator 318 is secured in housing first end 330 and extends into bore 324 so as to enable fluid communication between the actuator and bore 324 containing movable member 315, after activation of the tether retention mechanism. A portion of the actuator also extends outside of the housing first end. Housing first end 330 is then secured within a bore seal 336 so as to enclose the portion of the actuator extending from housing end 330. Bore seal 336 may then provide an interface permitting mating of a connector or other suitable signal transmission medium (not shown) with the actuator 318.

Actuator 318 may be secured within bore seal using any of a variety of known methods including, but not limited to, an interference fit, adhesive application, or crimping. Similarly, bore seal 336 may be secured to housing 312 using any of a variety of known methods including, but not limited to, crimping, welding, or adhesive application. In addition, features may be provided for engaging the actuator and/or bore seal with base 320 or a portion of the vehicle or device to which system 310 is mounted, to aid in preventing rotation or other movement of the actuator relative to housing 312 and/or base 320.

In one embodiment, actuator 318 is in the form of an electrically-actuated pyrotechnic initiator, or squib, secured within bore seal 336 or housing 312. Actuator 318 may be formed as known in the art. One exemplary actuator construction is described in U.S. Pat. No. 6,009,809, herein incorporated by reference. Bore seal 336 may be stamped, extruded, cast, machined, or otherwise metal formed and may be made from carbon steel or stainless steel, for example.

In alternative embodiments, actuator 318 may be in the form of a pneumatically or hydraulically actuated valve coupled to an end of housing 312 so as to enable fluid communication between an outlet of the valve and bore 324 upon receipt by the retention system of a suitable activation signal.

In these embodiments, activation of the system to actuation the tether results in opening of the valve to admit a high-pressure fluid into bore 324, resulting in movement of the movable member 315 as described below. Alternatively, actuator 318 may be positioned remotely from housing 312 but so as to enable fluid communication between the actuator and bore 324 upon receipt of a suitable activation signal by the tether retention mechanism.

At least one brace or guide 325 is provided for receiving and supporting a portion of support member 316 therein (or thereon). The embodiment shown in FIGS. 8-10 includes a pair of spaced apart braces 325a and 325b aligned along an axis substantially parallel with axis A and configured for receiving therein a portion 316a of the support member which extends outside of housing 312. Braces 325 serve to guide the motion of support member portion 316a, and may be configured to aid in supporting portion 316a against forces exerted on the support portion by tether 322. In addition, in the embodiment shown, braces 325a and 325b are positioned to either side of a section of portion 16a around which tether end 322a is looped. Thus, braces 325a and 325b bracket the tether, preventing motion of the tether parallel to axis A and preventing the tether end 322a from sliding off of support member 316. In the embodiment shown in FIGS. 8-10, braces are mounted on the same mounting surface as housing 312. However, the brace (or braces) may be mounted on any suitable mounting surface (or surfaces). In a particular embodiment, one or more braces 325 are formed integrally with housing 312, or are formed separately from the housing and suitably attached to the housing. Braces 325 may be formed from a metallic material or any other suitable material.

Base 320 may be any suitable mounting surface, for example, to a portion of a vehicle or device to which the tether retention mechanism is operatively coupled. In a particular embodiment, the base 320 is the same surface to which housing 312 is mounted. In another embodiment, base 320 is formed separately from the vehicle or other device and is attached by welding or any other suitable method to a portion of the vehicle or device to which the tether retention mechanism is to be secured.

One or more features may be provided for restricting movement of support member 316 after activation of the tether retention mechanism. In the embodiment shown in FIGS. 8-10 a portion of base 320 is punched and formed or otherwise shaped to provide a hard stop 320h for restricting movement of support member 316 in the direction of arrow C (FIG. 10). However, the motion-restricting feature may be located on support member 16 and configured to engage a portion of base 20, or the movement-restricting feature may have any of a variety of alternative forms.

Base 20 may be formed using any suitable method from a metallic material or any other suitable material.

A securement member 350 (for example, a conventional hold-down strap) may be used to secure the housing 312 to base 320 or to another portion of the vehicle or device to which the system 310 is attached. Alternatively, the housing 312 may be welded or otherwise suitably secured to its mounting surface.

As shown in FIGS. 8 and 9, prior to activation of the system to release tether 322, a looped end 322a of the tether is wrapped over support member 316 between braces 325a and 325b.

Referring again to FIGS. 8-10, in operation, upon receipt of a signal from a crash sensor or other system activation mechanism, an activation signal is sent to actuator 318. In an embodiment where the actuator is a squib, combustion products from the squib impinge on an end face of movable member 315 in fluid communication with the actuator, forcing the movable member in the direction indicated by arrow "C" in FIG. 10. Movement of the movable member 315 in direction "C" causes a corresponding movement of support member 316 in direction "C", while tether end 322a is prevented from moving in direction "C" by brace 325a and/or the portion of base 320 through which it projects. Thus, tether retention member 317 moves in direction "C" toward a second position (shown in FIG. 10) in which support for the tether has been removed. As support member 316 continues to move in direction "C", tether 322 may abut a portion of brace 325a or base 320, and the support member slides out of the loop formed in tether end 322a until the support member is completely extracted from the tether loop, at which point the tether is no longer supported by the support member 316. Thus, a tether 322 retained on the retention member 317 is released from the member during movement of the member from the first position (shown in FIGS. 8 and 9) to the second position (shown in FIG. 10). The tether end 322a is now permitted to move responsive to forces exerted thereon.

In a particular embodiment, the tether 322 is operatively coupled to a valve (not shown) controlling a flow of inflation gases from a vent of an airbag (also not shown). The mechanism is structured so that the valve remains closed while the tether end 322a is engaged with support member 316 as shown in FIGS. 8 and 9. Activation of the any of the tether retention mechanism embodiments described herein produces movement of the support member 316 and release of tether end 322a as just described. After support member 316 is extracted from the loop formed in tether end 322a, tension in the tether starts to relax, permitting the valve to open and allowing release of inflation gases from the airbag.

Embodiments of the tether retention mechanism disclosed herein may be activated to permit release of gases from the airbag via valve actuation in situations where a smaller or lighter vehicle occupant is present during a crash situation. Release of a portion of the gases from the inflated airbag provides a relatively softer, less rigid cushion for the lighter vehicle occupant.

Referring now to FIGS. 11-14, a releasable tether retention system 410 in accordance with one embodiment of the present invention includes a housing 412, a movable member 415 slidably mounted in housing 412, a tether retention member 416 coupled to the movable member, and an actuator 418 operatively coupled to housing 412 for producing a motion of movable member 415 after receipt of an actuation signal.

Housing 412 has a first end 430 with a first opening 430a and a second end 432 opposite first end 430. The second end 432 includes a second opening 432a. A housing wall 412a connects ends 430 and 432. In the embodiment shown, openings 430a and 432a are substantially coaxial along an axis B of the housing. An axial bore 424 extends through housing 412 between first end 430 and second end 432. One or more of ends 430 and 432 may be configured so as to be crimpable or otherwise deformable to aid in retaining movable member 415 or other components within (or to) housing 412. The deformable housing ends may also receive therein or engage other components to facilitate formation of seals proximate the ends of the housing. These seals may be substantially fluid-tight and aid in retaining actuation fluid (for example, pressurized gases) in the housing during operation of the tether retention system to release the tether. Housing 412 may include features such a shoulder 412b configured to limit the travel of tether retention member 416 (described below) or other components within bore 424 during operation of the tether retention system. Housing 412 may be formed using any suitable method from a metallic material or any other suitable material.

In the embodiment shown in FIGS. 11-14, an endcap 470 is secured to housing second end 432 so as to provide a substantially fluid-tight seal therebetween, to aid in preventing escape of pressurized actuation fluid from housing 412. In the embodiment shown, endcap 470 has a base portion 470a and an annular rim 470b projecting outwardly from the base portion to enable a portion of housing end 432 to be crimped over the rim, thereby securing the endcap to the housing inside bore 424. Endcap 470 also has an opening 470c extending therethrough to receive a second portion 416b of tether retention member 416 therein. Endcap 470 may be formed using any suitable method from a metallic material or any other suitable material.

Figure 12:
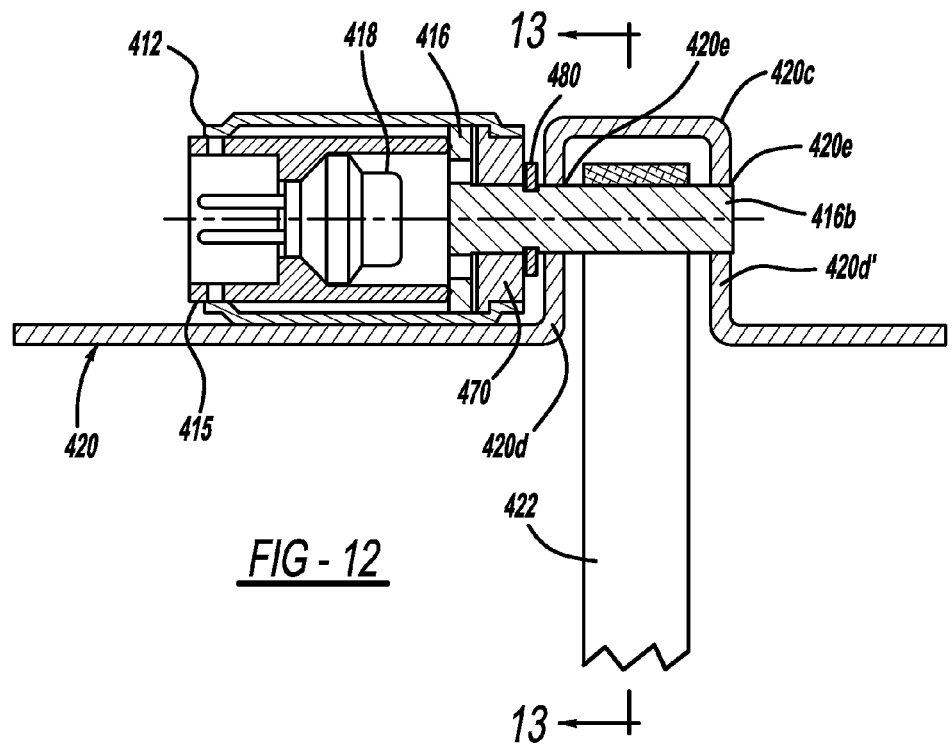
FIG. 12 is a cross-sectional side view of the embodiment of FIG. 11 showing the tether retention system attached to a mounting base and in a pre-activation condition, with a tether retained thereon.
Figure 13:
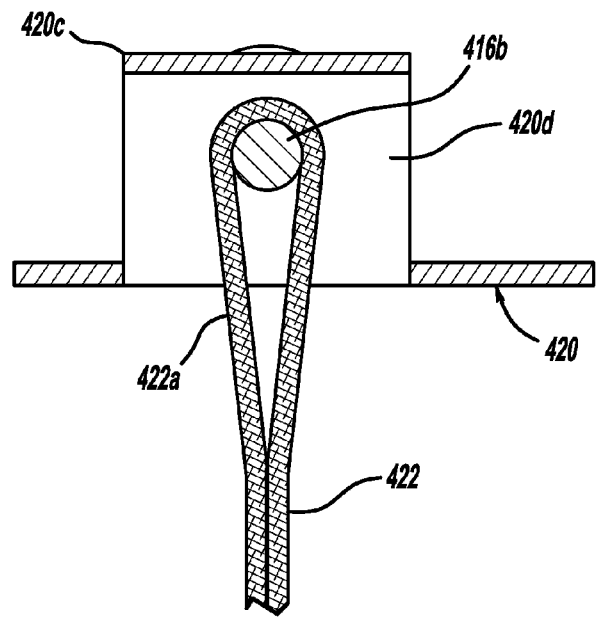
FIG. 13 is a cross-sectional end view of a portion of the embodiment shown in FIG. 12.

Referring to FIGS. 12 and 13, a base 420 is provided for mounting of housing 412 thereto. In one embodiment, base 420 comprises an integral portion of a vehicle or other device to which tether retention system 410 is to be attached. In another embodiment, base 420 is formed separately from the vehicle or other element and is attached by welding or any other suitable method to a portion of the vehicle or other device to which the tether retention system is to be secured.

In one embodiment, base 420 includes a protrusion 420c formed therein and configured for receiving a portion of tether 422 therein. Protrusion 420c has at least one wall portion 420d with at least one opening 420e formed therein. Opening(s) 20e is sized so as to enable a portion of retention member 416 to be inserted therein. An edge of opening 420e may provide a support or bearing surface for a portion of tether retention member 416 extending into the opening.

Referring to FIG. 12, in one particular embodiment, protrusion 420c includes at least a pair of opposed wall portions 420d, 420d' in which a pair of associated coaxial openings 420e are formed. Openings 420e are sized so as to enable portions of tether retention member 416 to be inserted therein. The opposed wall portions and associated openings 420e are also spaced apart so as to permit tether retention member 416 to span the protrusion and extend into both of openings 420e prior to actuation of the system to release the tether. Edges of openings 420e may provide support or bearing surfaces for portions of tether retention member 416 extending therethrough.

In an alternative embodiments, protrusion 420c, including wall portions 420d, 420d' and openings 420e are formed as part of housing 412 or as a separate part attached to housing 412. The housing and the protrusion attached thereto is then attached to base 420 and tether 422 applied to and retained on retention member 416 until actuation of the system to release the tether.

Base 420 and any features thereof may be formed using any suitable method from a metallic material or any other suitable material.

A securement member (not shown) (for example, a conventional hold-down strap) may be used to secure the housing 412 to base 420 or to another portion of the vehicle or device to which the system 410 is attached. However, housing 412 may be secured to base 420 by welding or by any other suitable method.

Movable member 415 is configured to slidably move along and within bore 424. In the embodiment shown in FIGS. 11-14, member 415 has a base portion 415a and a first wall 415b extending from an edge of the base portion in a first direction to define an open-ended first cavity 415c. A second wall 415d also extends from an edge of the base portion in a second direction opposite the first direction to define an open-ended second cavity 415e. Second cavity 415e may house, for example, electrodes 418a extending from actuator 418 (described below). Second wall 415d may be configured to provide an interface mateable with a complementary connector of a wiring harness or other suitable initiator activation signal transmission medium.

Movable member 415 is also dimensioned so as to slide along housing first end 30. The fit between movable member 415 and housing end 430 is configured to permit sliding of the movable member with respect to the housing wall while minimizing passage of actuation fluid through any clearance between the movable member and the housing.

Movable member 415 may be formed from a metallic material or any other suitable material.

Actuator 418 is configured to provide a pressurized fluid for moving the tether retention member from a first, pre-activation position to a second position in which the tether is released Actuator 418 is configured to enable fluid communication with an interior of housing 412 after activation of the tether retention system to release the tether. Actuator 418 provides or controls a flow of pressurized fluid that is directed into housing 412 to produce movement of movable member 415 and tether retention member 416. In the embodiment shown in FIGS. 11-14, actuator 418 is positioned and secured to movable member base portion 415a within first cavity 415c.

In one embodiment, actuator 418 is in the form of an electrically-actuated pyrotechnic initiator, or squib, secured to movable member base portion 415a. Actuator 418 may be formed as known in the art. One exemplary actuator construction is described in U.S. Pat. No. 6,009,809, herein incorporated by reference. In this embodiment, electrodes of actuator 418 extend through movable member base portion 415a into second cavity 415e to enable connection with a suitable wiring harness, for example. Actuator 418 may be secured within movable member 415 using any of a variety of known methods including, but not limited to, an interference fit, adhesive application, or crimping.

In alternative embodiments, actuator 418 includes a nozzle, valve or other device (not shown) coupled to movable member 415 and capable of directing a flow of actuation fluid into movable member first cavity 415c upon receipt by the retention system of a suitable activation signal. In these embodiments, activation of the system to release the tether results in a flow of pressurized actuation fluid to the nozzle or other device. The fluid then flows from the nozzle into first cavity 415c, resulting in movement of the movable member 415 as described below.

A portion of the actuator may be positioned remotely from housing 412 but with a conduit or other fluid transmission medium extending to the nozzle or other device to enable conveyance of actuation fluid to the nozzle.

In the embodiment shown, tether retention member 416 has a first portion 416a and a second portion 416b extending from the first portion. First portion 416a is dimensioned with respect to a diameter of bore 424 such that a sliding fit is provided between the first portion and housing wall 412a. The fit between first portion 416a and housing wall 412a is configured to permit sliding of the first portion with respect to the wall while minimizing passage of actuation fluid through the clearance between the first portion and wall. At least one opening 416c is formed in first portion 416a to enable fluid communication between a first side 416s of first portion 416a and a second side 416t of the first portion opposite the first side.

First portion 416a is welded or otherwise attached to an end of movable member first wall 415b such that ends of opening (s) 416c reside within first cavity 415c so as to enable fluid communication between first cavity 415c and second side 416t of tether retention member first portion 416a. Thus attached to movable member 415, tether retention member 416 moves in conjunction with the movable member within bore 424 as described below.

Thus, the embodiment of the tether retention system shown in FIGS. 11-14 includes a housing 412 defining a bore 424, and a tether retention member 416 having a first portion 416a configured for moving along the bore, and a second portion 416b configured for retaining a portion of a tether 422 thereon. The first portion 416a has at least one opening 416c to enable fluid communication between a first side 416s of the first portion and a second side 416t of the first portion opposite the first side. The retention member 416 is movable along the bore responsive to passage of a pressurized fluid through the at least one opening 416c from the first side 416s to the second side 416t.

Tether retention member 416 may be formed from a metallic material or any other suitable material.

A detent mechanism may be provided to aid in preventing movement of the tether retention member 416 within bore 424 prior to activation of the system to release the tether. In one embodiment, the detent mechanism includes a groove 416g formed in tether retention member second portion 416b and a deformable element 480 (such as, for example, a lock washer) received in groove 416g. Deformable element 480 is configured to be resiliently or plastically deformed to disengage from groove 416g responsive to forces exerted on element 480 as tether retention member 416 is moved in the direction indicated by arrow "A" during actuation of the system to release the tether.

Groove 416g is located along second portion 416b such that, prior to actuation of the system, deformable element 80 resides within groove 416g between endcap 470 and protrusion 420c (FIG. 12) so that the deformable element 80 abuts endcap 470 or a portion of housing 412 when the sliding member is moved in direction "A". This arrangement locks retention member 416 in a first, pre-activation position in which the tether is retained on the retention member, and also prevents motion of the sliding member in direction "A" prior to system activation. Groove 416g is also located such that deformable element 480 is exterior of protrusion 420c.

In a particular embodiment, the detent mechanism is configured so that a gap is provided between tether retention member first portion 416a and endcap 470 when the deformable element 480 abuts the endcap or a portion of housing 412.

Other forms of detent mechanism may also be employed, provided that such alternative detent mechanisms suitably restrict movement of tether retention member 416 (and movable member 415 attached thereto) prior to actuation of the system to release the tether, and provided such mechanisms are deactivated or disabled responsive to forces exerted on tether retention member 416 due to actuation of the system to release the tether.

In another particular embodiment, the detent mechanism is provided in the housing interior rather than exterior of housing 412.

As shown in FIGS. 11-14, prior to activation of the system to release tether 422, tether retention member 16 extends into openings 420e formed in protrusion 420c, spanning the width of the protrusion. A looped end 422a of the tether extends into protrusion 420c and is looped over tether retention member 16. In this embodiment, edges of openings 420e may provide support or bearing surfaces for portions of tether retention member 416 and prevent the tether from sliding off the end of the tether retention member.

Referring to FIGS. 11-14, in one method of assembly, actuator 418 is secured within movable member 415. Tether retention member 416 is then attached to the movable member. The movable member/tether retention member sub-assembly is then inserted into housing 412. The tether retention member second portion 416b is inserted into an opening 420e closest to the housing 412 and through the looped end 422a of tether 422. The tether retention member is then passed through the remaining opening 420e positioned along the opposite side of the protrusion. Housing 412 may be secured to base 420 either before or after insertion of the movable member and tether retention member therein. The deformable element 480 is then positioned in groove 416g to restrict motion of the tether retention member prior to system actuation.

Figure 14:
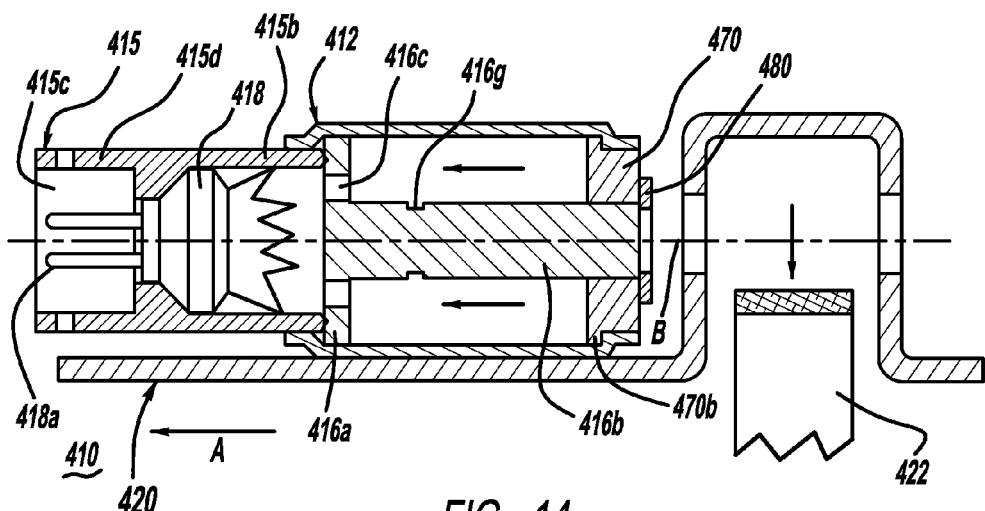
FIG. 14 is a cross-sectional plan view of the embodiment shown in FIG. 12 in a post-activation condition, after release of the tether.

Referring to FIGS. 12 and 14, in operation, upon receipt of a signal from a crash sensor or other system activation mechanism, an actuation signal is sent to actuator 418. In an embodiment where the actuator is a conventional squib or initiator, combustion products from the squib flow along first cavity 415c and through opening(s) 416c in tether retention member 416. Pressurized actuation fluid is forced between tether retention member first portion 416a and endcap 470, causing tether retention member 416 and the attached movable member 415 to move in direction "A". Deformable element 480 is then forced against endcap 470. As the forces urging slidable element in direction "A" increase, the element 480 deforms and detaches from groove 415g, allowing the tether retention member and movable member to continue moving in direction "A" toward a second position (shown in FIG. 14) in which support for the tether has been removed. As the retention member moves in direction "A", the tether may abut wall portion 420d. This movement of the tether retention member extracts tether retention member second portion 416b from one or more of openings 420e to a degree sufficient to remove second portion 416b from tether looped end 422a, thereby releasing the tether. Thus, a tether 422 retained on the member 416 is released from the member during movement of the member from the first position to the second position. Movement of movable member 415 in direction "A" may continue until tether retention member first portion 416a abuts a crimped or otherwise suitably configured portion of housing first end 430. Alternatively, other features may be incorporated into one or more of housing 412, tether retention member 416 and movable member 415 which interengage to stop motion of the tether retention member in direction "A".

Referring now to FIGS. 15-18, a releasable tether retention system 510 in accordance with another embodiment of the present invention includes a housing 512, a movable member 515 slidably mounted in housing 512, a tether retention member 516 coupled to the movable member, and an actuator 518 operatively coupled to housing 512 for producing a motion of movable member 515 after receipt of an actuation signal.

Figure 15:
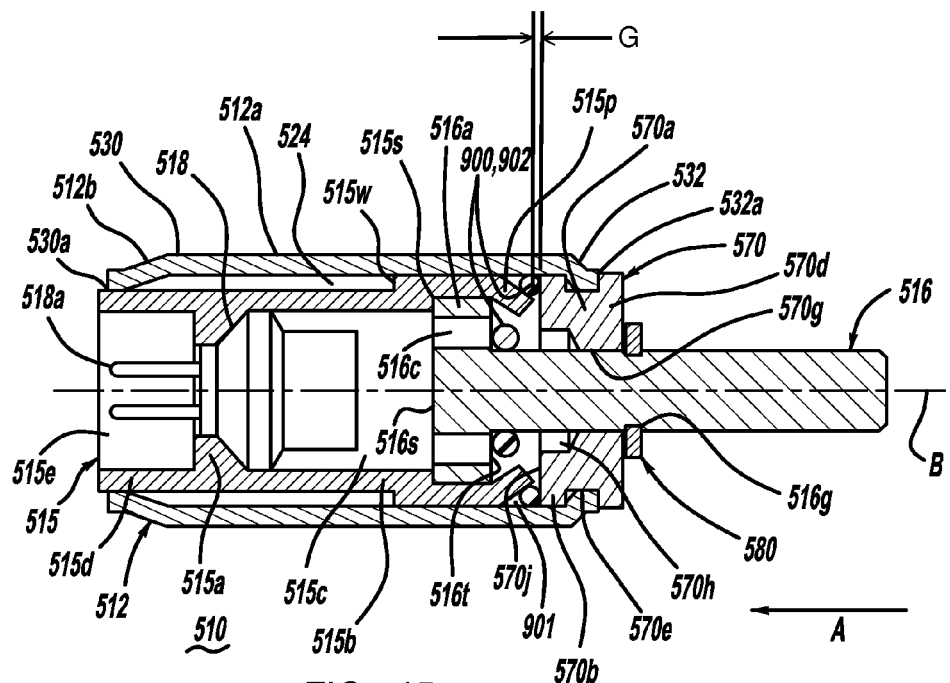
FIG. 15 is a cross-sectional side view of a releasable tether retention system and associated components thereof in accordance with another embodiment of the present invention.

Housing 512 has a first end 530 with a first opening 530a and a second end 532 opposite first end 530. The second end 532 includes a second opening 32a. A housing wall 512a connects ends 530 and 532. In the embodiment shown in FIGS. 15-18, openings 530a and 532a are coaxial along an axis B of the housing. An axial bore 524 extends through housing 512 between first end 530 and second end 532. One or more of ends 530 and 532 may be configured so as to be crimpable or otherwise deformable to aid in movable member 15 or other components within (or to) housing 512. The deformable housing ends may also receive therein or engage other components to facilitate formation of seals proximate the ends of the housing. These seals may be substantially fluid-tight and may aid in retaining actuation fluid (for example, pressurized gases) in the housing during operation of the tether retention system to release the tether. Housing 512 may include features such a shoulder, taper 512b (as shown in FIG. 15), or other feature configured to limit the travel of tether retention member 516 (described below), movable member 515 (also described below) or other components within bore 524 during operation of the tether retention system. Housing 512 may be formed using any suitable method from a metallic material or any other suitable material.

In the embodiment shown in FIGS. 15-18, an endcap 570 is secured to housing second end 532 so as to provide a substantially fluid-tight seal between the housing and endcap, to aid in preventing escape of pressurized actuation fluid from housing 512. In the embodiment shown, endcap 570 has a base portion 570a, a first rim 570b projecting outwardly from the base portion, and a second rim 570d spaced apart from rim 570b and projecting outwardly from the base portion. Rims 570b and 570d define a cavity 570e therebetween in which a portion of housing end 532 may be crimped or otherwise secured, thereby securing the endcap to the housing inside bore 524. Endcap 570 also has an opening 570g extending therethrough to receive second portion 516b of tether retention member 516 therein. A cavity 570h is formed in an inner face 570j of the endcap adjacent opening 570g. Cavity 570h is configured for receiving therein a seal 902 (described below) after actuation of the system to release the tether. Endcap 570 may be formed using any suitable method from a metallic material or any other suitable material.

Figure 16:
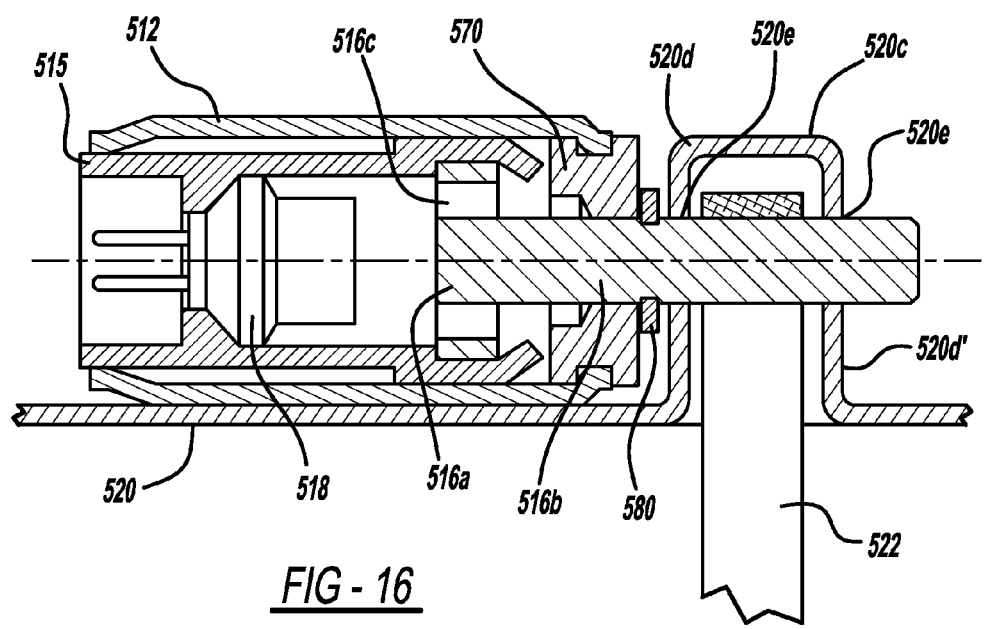
FIG. 16 is a cross-sectional side view of the embodiment of FIG. 15 showing the tether retention system attached to a mounting base and in a pre-activation condition, with a tether retained thereon.
Figure 17:
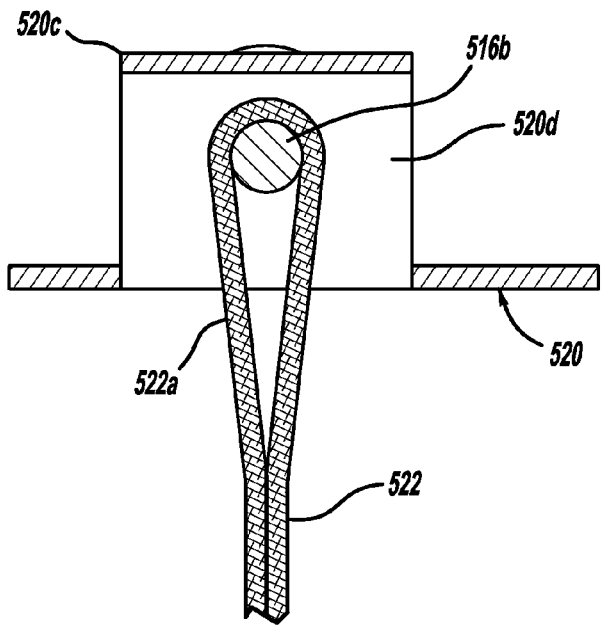
FIG. 17 is a cross-sectional end view of a portion of the embodiment shown in FIG. 16.
Figure 18:
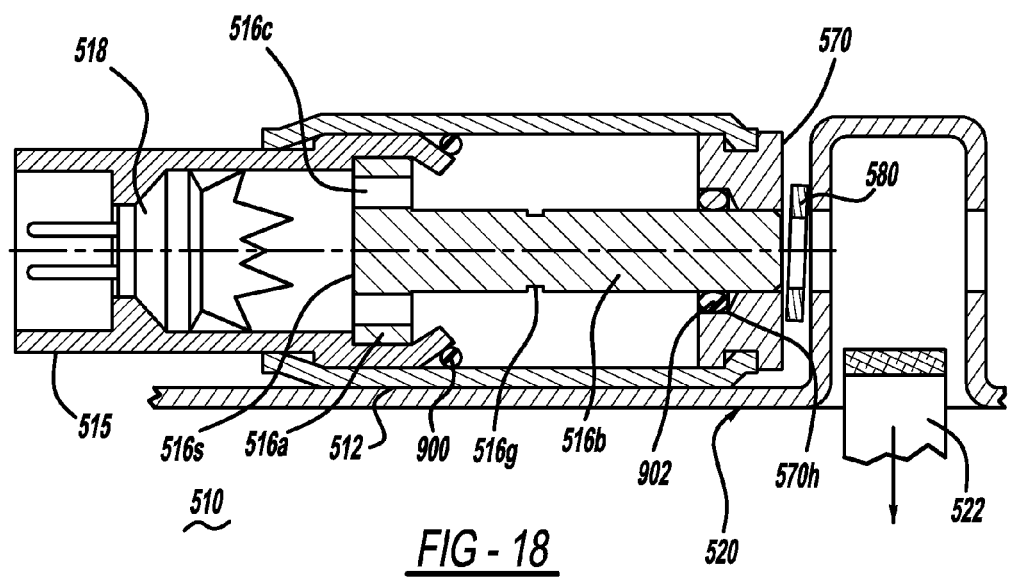
FIG. 18 is a cross-sectional plan view of the embodiment shown in FIG. 16 in a post-activation condition, after release of the tether.

Referring to FIGS. 16-18, a base 520 is provided for mounting of housing 512 thereto. In one embodiment, base 520 comprises an integral portion of a vehicle or other device to which tether retention system 510 is to be attached. In another embodiment, base 520 is formed separately from the vehicle or other element and is attached by welding or any other suitable method to a portion of the vehicle or other device to which the tether retention system is to be secured.

In one embodiment, base 520 includes a protrusion 520c formed therein and configured for receiving a portion of tether 522 therein. Protrusion 520c has at least one wall portion 520d with at least one opening 520e formed therein. Opening(s) 520e is sized so as to enable a portion of tether retention member 516 to be inserted therein. An edge of opening 520e may provide a support or bearing surface for a portion of tether retention member 516 extending into the opening.

Referring to FIG. 16-18, in one particular embodiment, protrusion 520c includes at least a pair of opposed wall portions 520d, 520d' in which a pair of associated coaxial openings 520e are formed. Openings 520e are sized so as to enable portions of tether retention member 516 to be inserted therein. The opposed wall portions and associated openings 520e are also spaced apart so as to permit tether retention member 516 to span the protrusion and extend into both of openings 520e prior to actuation of the system to release the tether. Edges of openings 520e may provide support or bearing surfaces for portions of tether retention member 516 extending therethrough.

In an alternative embodiments, protrusion 520c, including wall portions 520d, 520d' and openings 520e are formed as part of housing 512 or as a separate part attached to housing 512. The housing and the protrusion attached thereto is then attached to base 520 and tether 522 applied to and retained on retention member 516 until actuation of the system to release the tether.

Base 520 and any features thereof may be formed using any suitable method from a metallic material or any other suitable material.

A securement member (not shown) (for example, a conventional hold-down strap) may be used to secure the housing 512 to base 520 or to another portion of the vehicle or device to which the system 510 is attached. However, housing 512 may be secured to base 520 by welding or by any other suitable method.

Movable member 515 is configured to slidably move along and within bore 524. In the embodiment shown in FIGS. 15-19, member 515 has a base portion 515a and a first wall 515b extending from an edge of the base portion in a first direction to define an open-ended first cavity 515c. A shoulder 515s is formed along an interior of wall 515b to provide a surface against which a first portion 516a of tether retention member 516 abuts when positioned inside cavity 515c. Also, in the embodiment shown in FIGS. 15-18, a portion 515p of first wall 515b is crimped, formed, or otherwise directed inwardly to secure tether retention member first portion 516a between shoulder 515s and the inwardly-directed portion of first wall 515b, thereby securing tether retention member 516 to movable member 515. In addition, a shoulder 515w is formed along an exterior surface of wall 515b to provide a feature which abuts or otherwise engages a crimped or otherwise suitably-shaped portion of housing 512 during movement of the movable member in direction "A", to restrict movement of the movable member. A second wall 515d also extends from an edge of the base portion in a second direction opposite the first direction to define an open-ended second cavity 515e. Second cavity 515e may house, for example, electrodes 518a extending from actuator 518 (described below). Second wall 515d may be configured to provide an interface mateable with a complementary connector of a wiring harness or other suitable initiator activation signal transmission medium.

Movable member 515 is also dimensioned so as to slide along housing first end 530. The fit between movable member 515 and housing end 530 is configured to permit sliding of the movable member with respect to the housing wall while minimizing passage of actuation fluid through any clearance between the movable member and the housing. Movable member 515 may be formed from a metallic material or any other suitable material.

Actuator 518 is configured to provide a pressurized fluid for moving the tether retention member from a first, pre-activation position to a second position in which the tether is released. Actuator 518 is configured to enable fluid communication with an interior of housing 512 after activation of the tether retention system to release the tether. Actuator 518 provides and/or controls a flow of pressurized fluid that is directed into housing 512 to produce movement of movable member 515 and tether retention member 516. In the embodiment shown in FIGS. 15-19, actuator 518 is positioned and secured to movable member base portion 515a within first cavity 515c.

In one embodiment, actuator 518 is in the form of an electrically-actuated pyrotechnic initiator, or squib, secured to movable member base portion 515a. Actuator 518 may be formed as known in the art. One exemplary actuator construction is described in U.S. Pat. No. 6,009,809, herein incorporated by reference. In this embodiment, electrodes of actuator 518 extend through movable member base portion 515a into second cavity 515d to enable connection with a suitable wiring harness, for example. Actuator 518 may be secured within movable member 515 using any of a variety of known methods including, but not limited to, an interference fit, adhesive application, or crimping.

In alternative embodiments, actuator 518 includes a nozzle, valve or other device (not shown) coupled to movable member 515 and capable of directing a flow of actuation fluid into movable member first cavity 515*c* upon receipt by the retention system of a suitable activation signal. In these embodiments, activation of the system to release the tether results in a flow of pressurized actuation fluid to the nozzle or other device. The fluid then flows from the nozzle into first cavity 515*c*, resulting in movement of the movable member 515 as described below.

A portion of the actuator may be positioned remotely from housing 512 but with a conduit or other fluid transmission medium extending to the nozzle or other device to enable conveyance of actuation fluid to the nozzle.

In the embodiment shown, tether retention member 516 has a first portion 516*a* and a second portion 516*b* extending from the first portion. First portion 516*a* is positioned and secured within movable member cavity 515*c*, as previously described. At least one opening 516*c* is formed in first portion 516*a* to enable fluid communication between a first side 516*s* of first portion 516*a* and a second side 516*t* of the first portion opposite the first side.

First portion 516*a* is secured within cavity 515*c* (as previously described), welded or otherwise attached to movable member 515 such that ends 516*e* of opening(s) 516*c* are in fluid communication with first cavity 515*c*, so as to enable fluid communication between first cavity 515*c* and second side 516*t* of tether retention member first portion 516*a*. Thus attached to movable member 515, tether retention member 516 moves in conjunction with the movable member within bore 524 as described below.

Thus, the embodiment of the tether retention system shown in FIGS. 15-18 includes a housing 512 defining a bore 524, and a tether retention member 516 having a first portion 516*a* configured for moving along the bore, and a second portion 516*b* configured for retaining a portion of a tether 522 thereon. The first portion 516*a* has at least one opening 516*c* to enable fluid communication between a first side 516*s* of the first portion and a second side 516*t* of the first portion opposite the first side. The retention member 516 is movable along the bore responsive to passage of a pressurized fluid through the at least one opening 516*c* from the first side 516*s* to the second side 516*t*.

Tether retention member 516 may be formed from a metallic material or any other suitable material.

Prior to actuation of the tether retention system to release the tether, a first seal 900 (for example, an O-ring or other suitable resilient seal) is seated in a cavity 901 defined by inwardly-directed portion 515*p* of first wall 515*b*, housing wall 512*a*, and endcap 570. A groove or other suitable feature may be provided in first wall 515*b* to aid in retaining seal 900 along an exterior of the wall 515*b* prior to and during insertion of the movable member 515 into housing 512. Alternatively, an adhesive or other suitable means may be employed to hold the seal in place. In addition, a second seal 902 (for example, an O-ring or other suitable resilient seal) is positioned along tether retention member second portion 516*b* adjacent first portion 516*a*. Seals 900 and 902 aid in minimizing escape of actuation fluid through any clearance between the movable member 515 and the housing 512, and between tether retention member 516 and endcap 570.

A detent mechanism may be provided to aid in preventing movement of the tether retention member 516 within bore 524 prior to activation of the system to release the tether. In one embodiment, the detent mechanism includes a groove 516*g* formed in tether retention member second portion 516*b* and a deformable element 580 (such as, for example, a lock washer) received in groove 516*g*. Deformable element 580 is configured to be resiliently or plastically deformed to disengage from groove 516*g* responsive to forces exerted on element 580 as tether retention member 516 is moved in the direction indicated by arrow "A" during actuation of the system to release the tether.

Groove 516*g* is located along second portion 516*b* such that, prior to actuation of the system, deformable element 580 resides within groove 516*g* between endcap 570 and protrusion 520*c* so that the deformable element 580 abuts endcap 570 or a portion of housing 512 when the tether retention member is moved in direction "A". This arrangement prevents further motion of the tether retention member in direction "A" prior to system actuation. Groove 516*g* is also located such that deformable element 580 is exterior of protrusion 520*c*.

In a particular embodiment, the detent mechanism is configured so that a gap G is provided between tether retention member first portion 516*a* and endcap 570 when the deformable element 580 abuts the endcap or a portion of housing 512.

Other forms of detent mechanism may also be employed, provided that such any alternative detent mechanisms suitably restrict movement of tether retention member 516 (and movable member 515 attached thereto) prior to actuation of the system to release the tether, and provided such mechanisms are deactivated or disabled responsive to forces exerted on tether retention member 516 due to actuation of the system to release the tether.

In one particular embodiment, a portion of end closure 570 adjacent tether retention member second portion 516*b* may be plastically deformed (using, for example, a staking or other suitable operation) so as to project into groove 516*g*. Engagement of this deformed portion of second portion 516*b* with groove 516*g* acts to restrict movement of tether retention member 516 prior to actuation of the system to release the tether.

In another particular embodiment, the detent mechanism is provided in the housing interior rather than exterior of housing 512.

As shown in FIGS. 15-18, when installed in a vehicle and arranged so as to secure a tether 522, and prior to activation of the system to release the tether, tether retention member 516 extends into openings 520*e* formed in protrusion 520*c*, spanning the width of the protrusion. A looped end 522*a* of the tether extends into protrusion 520*c* and is looped over tether retention member second portion 516*b*. In this embodiment, edges of openings 520*e* may provide support or bearing surfaces for portions of tether retention member 516 and aid in preventing the tether from sliding off the end of the tether retention member.

Referring to FIGS. 15-18, in one method of assembly, actuator 518 is secured within movable member 515. Tether retention member 516 is then attached to the movable member. The movable member/tether retention member sub-assembly is then inserted into and slidably secured with housing 512. The tether retention member second portion 516*b* is inserted into an opening 520*e* closest to the housing 512 and through the looped end 522*a* of tether 522. The tether retention member is then passed through the remaining opening 520*e* positioned along the opposite side of the protrusion. Housing 512 may be secured to base 520 either before or after insertion of the movable member and tether retention member 516 therein. The deformable element 580 is then positioned in groove 516g to restrict motion of tether retention member prior to system actuation.

Referring to FIGS. 15-18, in operation, upon receipt of a signal from a crash sensor or other system activation mechanism, an actuation signal is sent to actuator 518. In an embodiment where the actuator is a conventional squib or initiator, combustion products from the squib flow along first cavity 515c and through opening(s) 516c in tether retention member 516. Pressurized actuation fluid is forced between tether retention member first portion 516a and endcap 570, causing tether retention member 516 and the attached movable member 515 to move in direction "A". Deformable element 580 is then forced against endcap 570. As the forces urging tether retention member 516 in direction "A" increase, the element 580 deforms and detaches from groove 515g, allowing the tether retention member and movable member to continue moving in direction "A" toward a second position (shown in FIG. 18) in which support for the tether has been removed. This movement of the tether retention member extracts second portion 516b from one or more of openings 520e to a degree sufficient to remove second portion 516b from tether looped end 522a, thereby releasing the tether. As the retention member moves in direction "A", the tether may abut wall portion 520d. Thus, a tether 522 retained on the member 516 is released from the member during movement of the member from the first position to the second position. Pressurized actuation fluid passing through opening(s) 516c also forces seal 902 into cavity 570h and aids in compressing the seal against the surfaces of endcap 570, to enhance effectiveness of the seal. Similarly, due to the pressure of the actuation fluid entering the portion of the housing between tether retention member first portion 516a and endcap 570, seal 900 is forced into a space between inwardly-extending wall portion 515p and housing wall 512a, thereby compressing the seal against wall portion 515p and housing wall 512a and enhancing effectiveness of the seal.

Movement of movable member 515 in direction "A" may continue until movable member shoulder 515w abuts a crimped or otherwise suitably configured portion of housing 512. Alternatively, other features may be incorporated into one or more of housing 512, tether retention member 516 and movable member 515 which interengage to stop motion of the tether retention member in direction "A".

Figure 19:
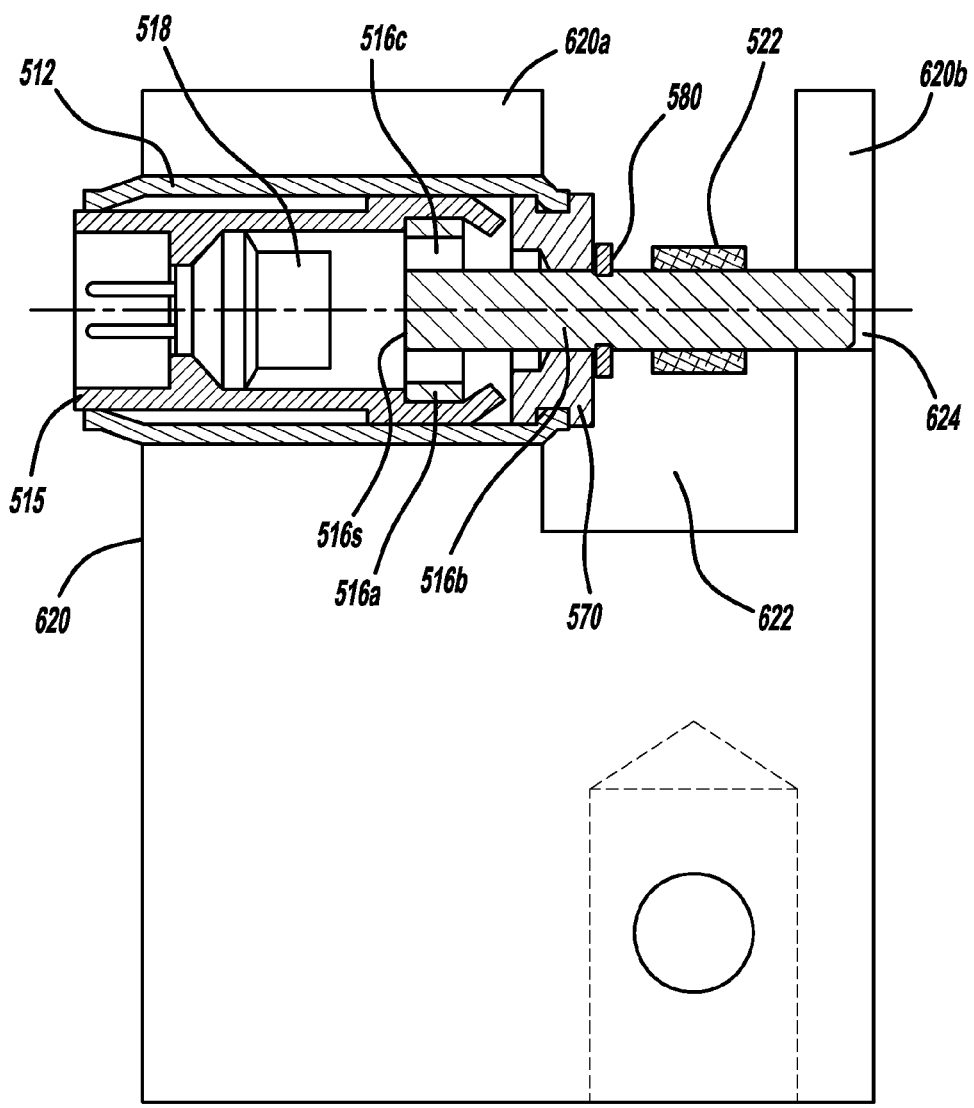
FIG. 19 is a cross-sectional side view of a releasable tether retention system and associated components thereof in accordance with another embodiment of the present invention.

Referring to FIG. 19, in another particular embodiment similar to the embodiment shown in FIGS. 15-18, housing 512 is mounted to a base 620 into which an opening 622 is formed between a first portion 620a and a second portion 620b of the base. Opening 622 permits tether 522 to extend through the base so that the looped end of the tether can be supported by tether retention member 516. A hole 624 is formed in second portion 620b for receiving an end of tether retention member 516 therein to support the end of the tether retention member. Thus, tether retention member 516 extends from housing 512 across opening 122 to second base portion 620b. Operation of the system shown in FIG. 19 to release the tether is as previously described.

Figure 7:
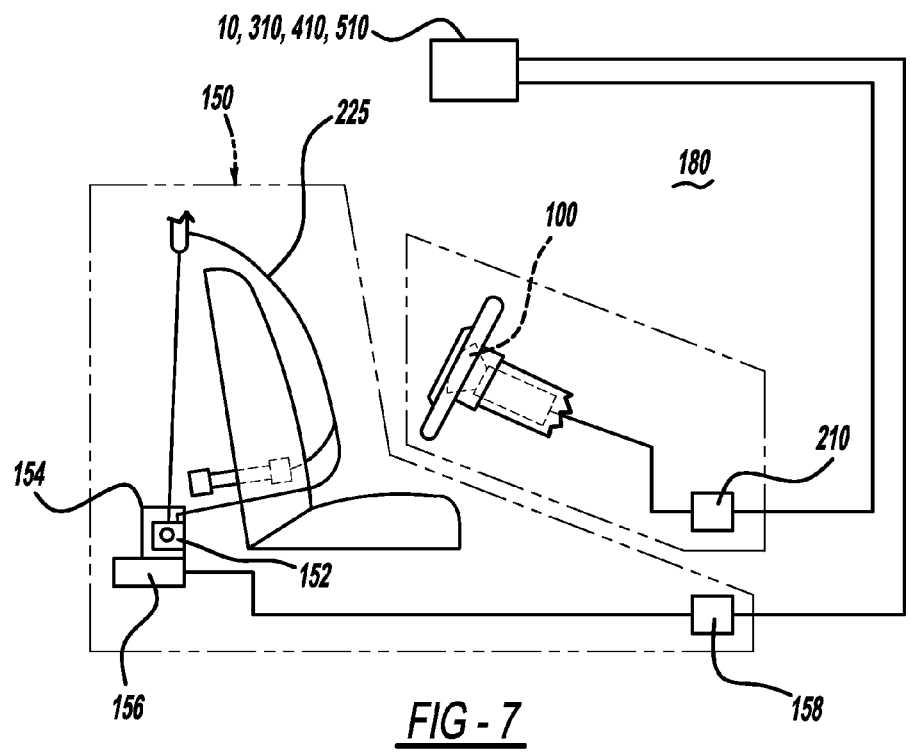
FIG. 7 is a schematic representation of an exemplary vehicle occupant protection system incorporating a releasable tether retention system in accordance with an embodiment of the present invention.

FIG. 7 shows a particular application of a releasable tether retention system 10 in accordance with the present invention. Referring to FIG. 7, the releasable tether retention system is incorporated into a vehicle occupant protection system 180 including additional elements such as, for example, a safety belt assembly 150 and/or an airbag module. FIG. 7 shows a schematic diagram of one exemplary embodiment of such a protection system. Tether retention system 10 may be in operable communication with a crash event sensor 210 which is in communication with a known crash sensor algorithm that signals actuation the tether release mechanism via activation of an actuator in accordance with one of the embodiments described herein based on any desired criteria, for example, the occurrence of a collision event, deployment of a vehicle airbag, the occurrence of a predetermined occupant condition, or any other desired criteria.

Safety belt assembly 150 includes a safety belt housing 152 and a safety belt 225 in accordance with the present invention extending from housing 152. A safety belt retractor mechanism 154 (for example, a spring-loaded mechanism) may be coupled to an end portion of the belt. In addition, a safety belt pretensioner 156 may be coupled to belt retractor mechanism 154 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667,161, 5,451,008, 4,558,832 and 4,597,546, incorporated herein by reference. Illustrative examples of typical pretensioners in system 150 are described in U.S. Pat. Nos. 6,505,790 and 6,419,177, incorporated herein by reference.

Safety belt system 150 may be in communication with a crash event sensor 158 (for example, an inertia sensor or an accelerometer) including a known crash sensor algorithm that signals actuation of belt pretensioner 156 via, for example, activation of a pyrotechnic igniter (not shown) incorporated into the pretensioner. U.S. Pat. Nos. 6,505,790 and 6,419,177, incorporated herein by reference, provide illustrative examples of pretensioners actuated in such a manner.

If desired, one or more of sensors 210 and/or 158 may be operatively coupled to a tether retention system actuator as described herein to provide one or more associated inputs prompting activation of the valve release mechanism, depending on such factors as vehicle occupant weight, elapsed time since the occurrence of a collision event, or any other pertinent factors.

It will be understood that the foregoing descriptions of embodiments of the present invention are for illustrative purposes only. As such, the various structural and operational features herein disclosed are susceptible to a number of modifications commensurate with the abilities of one of ordinary skill in the art, none of which departs from the scope of the present invention as defined in the appended claims.

What is claimed is:

1. A releasable tether retention system comprising:
a housing; and
a tether retention member including a portion movably mounted in the housing,
a groove formed about the tether retention member,
a locking member engaged with said groove to retain the tether retention member,
wherein said locking member engaged with said groove retains a tether on the member when the member is positioned in a first position, and
wherein the system is configured so that a tether retained on the tether retention member is released from the tether retention member during movement of the tether retention member from the first position to a second position different from the first position, and
wherein the tether retention member has a first portion and a second portion extending from the first portion, and wherein the first portion is configured to slidably move within a bore of the housing, and
wherein at least one opening is formed in the first portion to enable fluid communication between a first side of the first portion and a second side of the first portion opposite the first side.

2. The system of claim 1 further comprising an actuator configured to provide a pressurized fluid for moving the tether retention member from the first position to the second position.

3. The system of claim 2 wherein the actuator comprises a pyrotechnic initiator.

4. The system of claim 2 wherein the actuator comprises a valve operatively coupled the housing so as to enable fluid communication between an outlet of the valve and the retention member after activation of the tether retention system.

5. The system of claim 1 wherein the housing defines a bore therein, and wherein at least a portion of the retention member is movably positioned within the bore.

6. The system of claim 1 wherein the housing has an opening extending therethrough and configured for receiving a portion of a tether therein.

7. The system of claim 6 further comprising a pair of connecting portions connecting a first housing portion to a second housing portion, and wherein the housing opening is formed between the pair of connecting portions and between the first and second housing portions.

8. The system of claim 1 wherein the housing defines a bore therein, and wherein the system further comprises at least one brace configured for supporting a portion of the tether retention member extending exterior of the bore.

9. The system of claim 8 further comprising a first axis extending through the bore, wherein the retention member is movable along the first axis, and wherein the system further comprises a pair of braces aligned along a second axis substantially parallel with the first axis.

10. The system of claim 9 wherein the braces are configured to support a portion of the tether retention member extending between the braces prior to activation of the tether retention system.

11. The system of claim 1 further comprising a mounting base for the housing and a protrusion formed along the housing and configured for supporting a portion of the tether retention member prior to activation of the tether retention system.

12. A releasable tether retention system comprising:
   housing defining a bore
   tether retention member having a first portion configured for moving along the bore
   and a second portion configured for retaining a portion of a tether thereon,
   wherein the first portion has at least one opening to enable fluid communication between a first side of the first portion and a second side of the first portion opposite the first side to release an associated tether,
   and wherein the retention member is movable along the bore responsive to passage of a pressurized fluid through the at least one opening from the first side to the second side.

* * * * *